(12) United States Patent
Newstadt et al.

(10) Patent No.: US 10,820,137 B1
(45) Date of Patent: Oct. 27, 2020

(54) METHOD TO DETERMINE WHETHER DEVICE LOCATION INDICATES PERSON LOCATION

(71) Applicant: NortonLifeLock Inc., Tempe, AZ (US)

(72) Inventors: Keith Newstadt, West Newton, MA (US); Ilya Sokolov, Boston, MA (US)

(73) Assignee: NortonLifeLock, Inc., Tempe, AZ (US)

( * ) Notice: Subject to any disclaimer, the term of this patent is extended or adjusted under 35 U.S.C. 154(b) by 650 days.

(21) Appl. No.: 15/238,580

(22) Filed: Aug. 16, 2016

(51) Int. Cl.
*H04W 24/00* (2009.01)
*H04W 4/02* (2018.01)
*H04W 4/33* (2018.01)

(52) U.S. Cl.
CPC ............ *H04W 4/02* (2013.01); *H04W 4/026* (2013.01); *H04W 4/027* (2013.01); *H04W 4/33* (2018.02); *H04M 2250/10* (2013.01); *H04M 2250/12* (2013.01)

(58) Field of Classification Search
CPC ....... H04W 4/02; H04W 4/026; H04W 4/027; H04W 4/043; H04M 2250/10; H04M 2250/12

USPC ...................................................... 455/456.1
See application file for complete search history.

(56) References Cited

U.S. PATENT DOCUMENTS

| | | | |
|---|---|---|---|
| 2015/0133086 A1* | 5/2015 | Pratt | G06F 1/3203 455/411 |
| 2015/0288688 A1* | 10/2015 | Derakhshani | H04L 63/0861 726/19 |
| 2016/0286366 A1* | 9/2016 | Hsieh | H04W 4/70 |
| 2018/0032997 A1* | 2/2018 | Gordon | G06Q 20/3224 |

* cited by examiner

*Primary Examiner* — Huy C Ho
(74) *Attorney, Agent, or Firm* — FisherBroyles, LLP

(57) ABSTRACT

Techniques are disclosed to predict whether a current location of a mobile device corresponds to a user of that mobile device. To do so, the mobile device may evaluate information from sensors that indicate a current state of the device or device surroundings. Based on the probability, the mobile device may send the current location and the probability to a user of the mobile device, an application on the device, or another party.

20 Claims, 6 Drawing Sheets

METHOD TO DETERMINE WHETHER DEVICE LOCATION INDICATES PERSON LOCATION

BACKGROUND

Field

Embodiments presented herein generally relate to techniques for verifying the geographical location of a user of a mobile device. More specifically, embodiments presented herein evaluate a variety of information captured by a mobile device to predict the probability that a location of a mobile device, in fact, corresponds to a location of a user of that mobile device.

Description of the Related Art

Using GPS to locate and track a mobile device are well known concepts. Many mobile device applications use GPS to determine the location of a user of the mobile device. Some applications can also share the location of the user to other individuals. For example, a friend can use an application to locate the corresponding user of a mobile device. The application then uses GPS to locate the mobile device of the corresponding user and broadcast the location of the corresponding user to the friend.

An example of this type of application includes a child tracking application which allows a parent to monitor the location of a child. Other applications use the location of the device to determine how to manage the behavior of the device. For example, a sound management application may silence a mobile device when the mobile device is located in a conference room.

In each example, an application on the mobile device relies on GPS (or other information) to determine the location of a device and use that location as a proxy for a location of the corresponding user. However, the location of the mobile device may not be the same as the location of the corresponding user. For example, a child may be at home while their mobile device is at school. When a parent uses an application to locate the child, the application indicates that the child is at school because the mobile device is located at school.

SUMMARY

One embodiment presented herein includes a method for predicting whether a location of a mobile device indicates a location of a corresponding user. The method may generally include determining a location of the mobile device. The method may also include obtaining, from each of one or more sensors on the mobile device, sensor data indicating at least one of a current state of the mobile device and a current state of ambient surroundings of the mobile device. The method may also include determining, based on the obtained sensor data, a probability that the corresponding user is currently in possession of the mobile device.

Another embodiment presented herein includes a computer-readable storage medium storing instructions, which, when executed on a processor, perform an operation to predict whether a location of a mobile device indicates a location of a corresponding user. The operation may generally include determining a location of the mobile device. The operation may also include obtaining, from each of one or more sensors on the mobile device, sensor data indicating at least one of a current state of the mobile device and a current state of ambient surroundings of the mobile device. The operation may also include determining, based on the obtained sensor data, a probability that the corresponding user is currently in possession of the mobile device.

Still another embodiment presented herein includes a system having a processor and a memory hosting an application, which, when executed on the processor, performs an operation to predict whether a location of a mobile device indicates a location of a corresponding user. The operation may generally include determining a location of the mobile device. The operation may also include obtaining, from each of one or more sensors on the mobile device, sensor data indicating at least one of a current state of the mobile device and a current state of ambient surroundings of the mobile device. The operation may also include determining, based on the obtained sensor data, a probability that the corresponding user is currently in possession of the mobile device.

BRIEF DESCRIPTION OF THE DRAWINGS

So that the manner in which the above recited features of the present disclosure can be understood in detail, a more particular description of the disclosure, briefly summarized above, may be had by reference to embodiments, some of which are illustrated in the appended drawings. It is to be noted, however, that the appended drawings illustrate only exemplary embodiments and are therefore not to be considered limiting of its scope, may admit to other equally effective embodiments.

DETAILED DESCRIPTION

Figure 1:
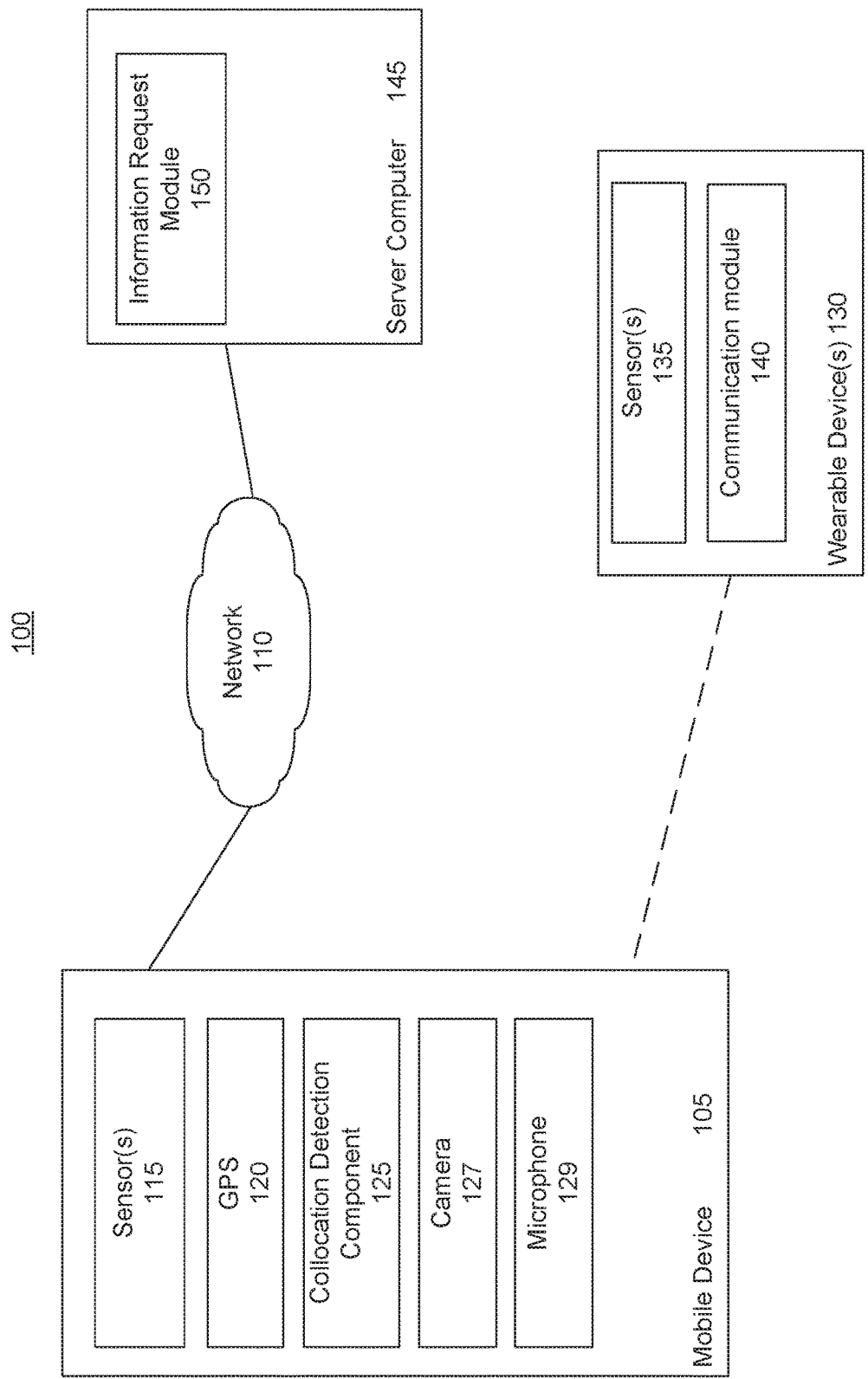
FIG. 1 illustrates an example computing environment, according to one embodiment.

Embodiments presented herein provide techniques for predicting whether the location of a mobile device corresponds to the location of a user of that mobile device. For example, an application on a mobile device may evaluate a variety of ambient sensor data regarding a state of the device to predict whether a corresponding user possesses that device. The ambient sensor data may include, for example, a position or posture of the device, wireless connections of the device, ambient temperature, an amount of time passed since the last activity on or around the device, motion detected by accelerometers, whether a microphone can identify a voice, and whether a camera can identify a face.

In one embodiment, a colocation detection component (i.e., an application on the mobile device) determines a probability that the corresponding user is near the mobile device based on the collected sensor data. More generally, the colocation detection component determines a probability that the mobile device is currently within the possession, custody, or control of the corresponding user. In some cases, this means the user actively holding (and possibly using) the mobile device (e.g., while talking on a telephone call or sending messages). However, it could also mean the person is nearby, e.g., if the mobile device is determined to be in a vehicle (based on position and movement) or at a location associated with the user (e.g., home work or school). Based on the probability, applications on the mobile device may modify certain behaviors of the mobile device or send messages to a given user of the mobile device (or other parties).

In one embodiment, a requesting party (e.g., a remote application) may send a request to a colocation detection component on a mobile device for a probability that a user is holding or located near the mobile device. For example, a parent may request the probability that a mobile device of a child is located near the child. When such a request is received, the colocation detection component obtains a location of the mobile device as well as information about the device and the surroundings of the device. The information obtained may be used to measure a probability that a corresponding user is near the location of the mobile device. Once determined, the colocation detection component may send the location of the mobile device along with the probability that the corresponding user is near the location of the mobile device to the requesting party. In other cases, the location of the mobile device and the probability may be sent to an application on the mobile device. The application on the device may take different actions depending on how likely it is (or not) that the user possesses the mobile device.

In other cases, the location of the mobile device or the probability (or both) may be sent, to a remote computing device without a request. For example, the mobile device may periodically determine whether a user is in possession of the mobile device and report this information to other systems. For example, a parent may periodically receive the location of a mobile device of a child and the probability that the child is near that mobile device using an application. As noted, the colocation detection component determines a physical location of that device and obtains information from sensors on the device. Information may also be obtained from other devices that are wirelessly connected to and located near the mobile device. The colocation detection component uses the obtained information to generate the probability that the child is near (or otherwise in possession of) the mobile device. Once generated, the colocation detection component on the mobile device may send the location of that device along with the probability that the child is near the device to the application used by the parent.

In one embodiment, the colocation detection component may monitor a location of a mobile device as well as information about the mobile device and the surroundings of the device. The information may be used to generate the probability that a corresponding user is near the location of the mobile device. For example, the information may indicate that the mobile device is lying flat on a table, is located in the conference room, and has not moved in over two hours. Based on this information, the probability that the user is near the device will be low. The information about the mobile device and the surroundings may include data obtained from one or more sensors on the mobile device or on a device wirelessly connected to the mobile device (e.g., a wearable device). The information may also include data obtained from a camera or a microphone on the mobile device. Once generated, a colocation detection component on the device may compare the probability to a threshold.

If the probability meets or exceeds the threshold, then the user is near the mobile device. In that case, the colocation detection component continues to monitor the location of the device and information about the device and the surroundings of the device. If the probability does not meet or exceed the predetermined threshold, the colocation detection component may send the probability to an application. Based on the probability that the user is near the mobile device, the application may modify a behavior of the mobile device. The application may also use a geo-fence along with the probability to determine or modify the behavior of the device.

For example, an application may turn off a speaker on a mobile device as long as the mobile device is located in a conference room. The colocation detection component may monitor the location of the mobile device as well as information about the mobile device and the surroundings of the device. The colocation detection component may use the information to generate a probability that a user is near the device and compare the probability to a predetermined threshold. The probability indicates that the user is near the device if it satisfies the threshold. If the colocation detection component determines the probability is below the threshold, the colocation detection component may send the location of the device as well as the probability to an application. The application may use the probability to turn on the speaker on the mobile device and assist the user to locate the mobile device.

Advantageously, techniques described herein allow an individual or an application to verify that the location of a mobile device indicates the location of a corresponding user. Further, applications on the mobile device can modify behavior of the mobile device based on the probability that the location of the corresponding user is near the location of the mobile device. These advantages increase the confidence in locating the corresponding user of a mobile device and in preventing loss of a mobile device.

FIG. 1 illustrates an example computing environment 100, according to one embodiment. As shown, the computing environment 100 includes a mobile device 105, a network 110, and a server computer 145. The network 110 may be representative of a cellular network, local area network or similar network.

As shown, the server computer 145 includes an information request module 150. The information request module 150 communicates with mobile device 105 over network 110. For example, the information request module 150 may send a request to mobile device 105 for a current location along with a probability that a mobile device 105 is in possession, custody, or control of a corresponding user. The information request module 150 may also receive a response from mobile device 105.

The mobile device 105 includes one or more sensors 115, a global positioning system (GPS) 120, and a colocation detection component 125. Colocation detection component 125 obtains the location of mobile device 105 from GPS 120. Colocation detection component 125 also samples the sensors 115 for information about the status of mobile device 105. The information from sensors 115 may include data regarding the state of mobile device 105. As discussed in more detail below, sensors 115 may return data describing a posture or position of the mobile device, wireless connections of the device, ambient temperature, an amount of time passed since the last activity on the device, and motion detected by an accelerometer.

As shown, mobile device 105 includes a camera 127 and a microphone 129. In some embodiments, the colocation detection component 125 obtains information from camera 127 or microphone 129. Information from the camera 127 may be used to identify a face of a user, and information from the microphone 129 may be used to identify a voice of a user.

As shown, one or more wearable devices 130 may be connected to mobile device 105. Wearable device 130 may include one or more sensors 135 and a communication module 140. The communication module 140 communicates with mobile device 105 over a wireless connection. For example, communication module 140 may send information from sensors 135 of wearable device 130 to the colocation detection component 125. Information from sensors 135 may include data regarding a person in possession of the wearable device such as a heartbeat or a skin conductance. The fact that wearable device 130 is able to connect wirelessly to mobile device 105 may also indicate that a user of the mobile device is near the location of mobile device 105. The colocation detection component 125 may use the information from sensors 135 in calculating a score that represents the probability that the location of the user is similar to the location of mobile device 105. In this context, wearable devices 130 may include a device connected to a mobile device by Bluetooth, Wi-Fi, or a similar wireless communication. For example, wearable devices 130 may include a smartwatch or key fob connected to mobile device 105 via Bluetooth.

Once information is obtained from sensors 115, GPS 120, wearable devices 130, and other sources such as a camera or a microphone, colocation detection component 125 evaluates the information and calculates the probability that the user is near the location of mobile device 105 (or the user is actively using that mobile device). Once calculated, the probability as well as the location of mobile device 105 may be sent to server computer 145 or an application executing on mobile device 105.

Figure 2:
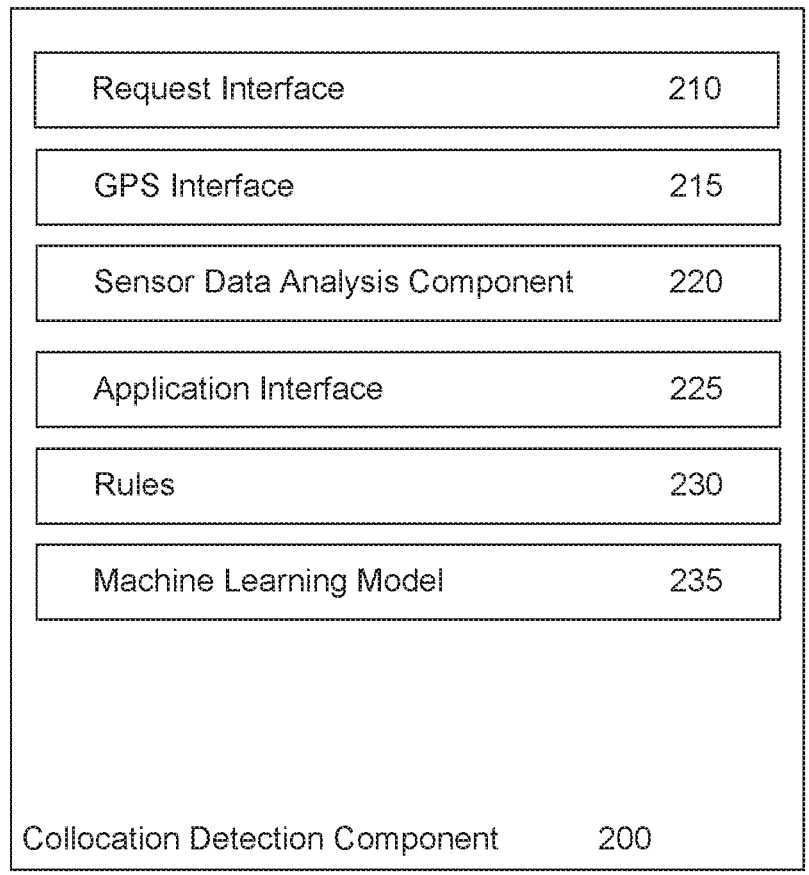
FIG. 2 illustrates an example colocation detection component on a mobile device, according to one embodiment.

FIG. 2 illustrates an example colocation detection component 200 on a mobile device, according to one embodiment. As illustrated, colocation detection component 200 includes a request interface 210, a GPS interface 215, a sensor data analysis component 220, and an application interface 225. The mobile device described in FIG. 2 may refer to mobile device 105 as depicted in FIG. 1.

In one embodiment, the GPS interface 215 communicates with a GPS on the mobile device and obtains the location of the mobile device. The sensor data analysis component 220 obtains the location of the mobile device from GPS interface 215. The sensor data analysis component 220 also samples the sensors on the mobile device (or a wearable device) for information regarding the state and surroundings of the mobile device. Information may also be obtained from a camera or a microphone on the mobile device. The sensor data analysis component 220 analyzes the obtained information to calculate the probability that a corresponding user is near the location of the mobile device.

The probability may be calculated by evaluating the obtained information from each sensor and comparing the information to a set of factors. Some factors may increase the probability that a corresponding user is near the mobile device while others may decrease the probability. For example, factors that may increase the probability could include whether the accelerometer on the mobile device detects motion, whether the ambient temperature of the mobile device is close to average body temperature, whether the microphone on the mobile device can identify a voice of the user, whether the camera on the mobile device can identify a face of the user, whether the mobile device is wirelessly connected to another device (e.g., a wearable device or key fob), and whether a device connected to the mobile device can detect the heartbeat and/or skin conductance of a user.

Factors that may decrease the probability include whether the mobile device is idle, has a locked screen or the screen is off, is plugged in or docked, is lying horizontal (i.e., flat on a surface), is lying horizontal with the screen facing down, and whether the mobile device is located in a vehicle but a key to the vehicle is not nearby. An application on the mobile device may determine whether the device is in a vehicle and that the key is not nearby based on a Bluetooth connection or using a geo-fence. The application may also use a tracking device attached to the key to determine a proximity of the device to the key.

The request interface 210 may receive a request for the location of the mobile device as well as the probability that a corresponding user is located near the device. As noted, the probability may indicate whether the corresponding user is in possession of the mobilize device (e.g., making a call or sending messages or interacting with an app), near the device (e.g., the device was recently used to make a call or recently went from moving to stationary), or otherwise in control of the device (e.g., the device is in a location associated with the user at a given time such as a student's phone being in a classroom during a scheduled class). The request may be sent from an application executing on the mobile device or a remote application. The request interface 210 may also respond to the request by sending the location of the mobile device and the calculated probability to the requesting party.

In one embodiment, the sensor data analysis component 220 compares the calculated probability to a predetermined threshold. The threshold represents a value that the calculated probability must satisfy to indicate that a user is located near the mobile device. A probability that does not meet the threshold indicates that the user is not near the device. If the calculated probability does not meet the threshold, the application interface 225 may send the calculated probability to an application. Based on the probability that the user is near the location of the mobile device (or not), the application may modify the behavior of the mobile device.

For example, an application on mobile device may turn off a speaker on the device while the device is located in a conference room. The sensor data analysis component 220 obtains information from the sensors on the mobile device (or a wearable device) and calculates the probability that a user is near the location of the device. As long as the device is in the conference room and the probability satisfies the predetermined threshold, the application may keep the speaker turned off. Once the probability does not satisfy the threshold or the device is no longer in the conference room, the application may turn the speaker on.

As shown, colocation detection component 200 may include a set of rules 230, and a machine learning model 235. The rules 230 may include factors used to determine a threshold. The factors may be similar to the factors described above in calculating the probability that a user is near the location of a mobile device. The threshold may be determined by setting a minimum number of factors that must be met for the location of the mobile device to indicate the location of a corresponding user.

As an alternative to determining the probability based on sensor data, a machine learning model 235 may be trained to predict the probability that a mobile device location corresponds to a user location. For example, a machine learning model may be trained using a set of examples of mobile device sensor data labeled as being an example of the user having (or not having) possession of the mobile device. The training data allows the model 235 to identify correlations between values of mobile device sensor data and relative weights regarding the presence or absence of any given factor. In some cases, the trained model 235 provides a weighted equation that can generate a probability from a set of sensor inputs.

Figure 3:
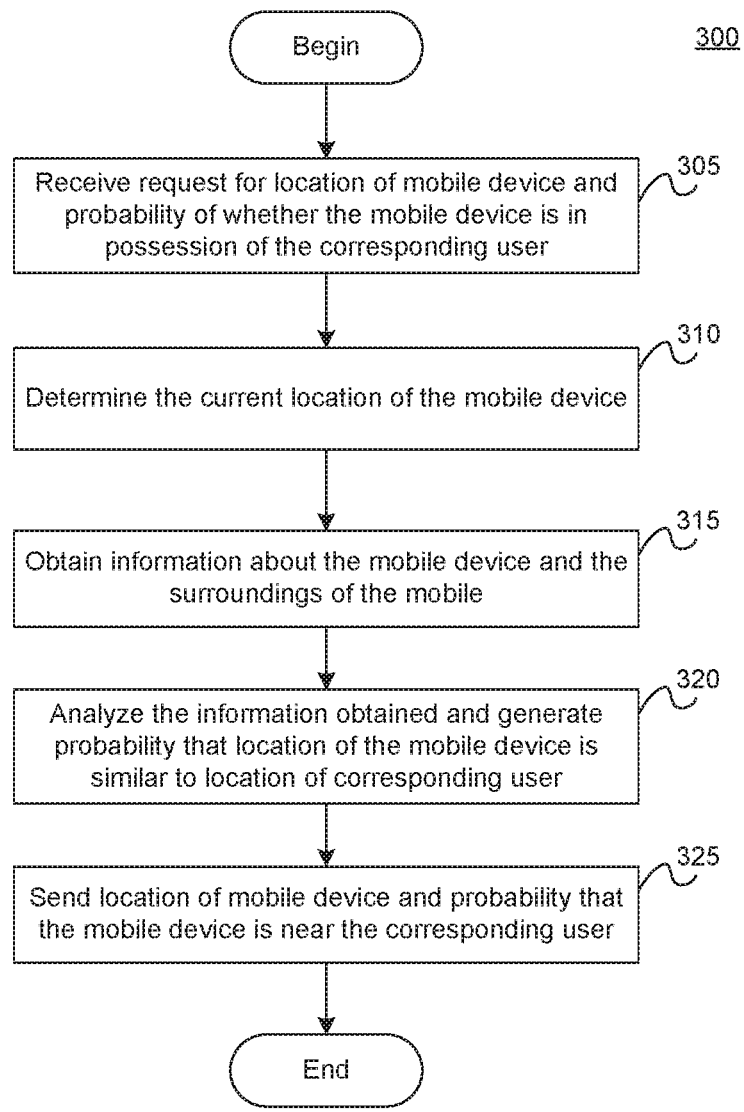
FIG. 3 illustrates a method for generating a probability that the location of a mobile device is similar to the location of a corresponding user, according to one embodiment.

FIG. 3 illustrates a method 300 for generating a probability that the location of a mobile device is similar to the location of a corresponding user, according to one embodiment. As shown, method 300 begins at step 305, where a colocation detection component receives a request through a request interface for the location of a mobile device and the probability that the location of the mobile device is near the location of a corresponding user. For example, a requesting party may send a request to the mobile device of a corresponding user for the location of the mobile device and the probability that the corresponding user is located near the mobile device.

In other cases, the colocation detection component may periodically determine a location of the mobile device and determine a probability that a user is near the location of the mobile device. For example, the colocation detection component may periodically, at regular intervals, or after a set period of time has passed with no activity on the device, check the location and probability that a user is near the location of the mobile device.

At step 310, the GPS on the mobile device determines the location of the mobile device. The colocation detection component obtains the location of the mobile device from the GPS through the GPS interface. At step 315, the sensor data analysis component samples the sensors of the mobile device to obtain information about the mobile device and the surroundings of the mobile device. The sensor data analysis component may also obtain information about the device and the surroundings of the device from the sensors of a wearable device connected to the mobile device, a camera on the mobile device, or a microphone on a mobile device.

At step 320, the sensor data analysis component analyzes the obtained information and generates the probability that the location of the mobile device is similar to the location of the corresponding user. To generate the probability, the sensor data analysis component may use the factors discussed above. At step 325, the colocation detection component sends the location of the mobile device and the probability that the mobile device is near the corresponding user to the requesting party. In other cases, the colocation detection component may send the location of the device and the probability to an application on the mobile device.

Figure 4:
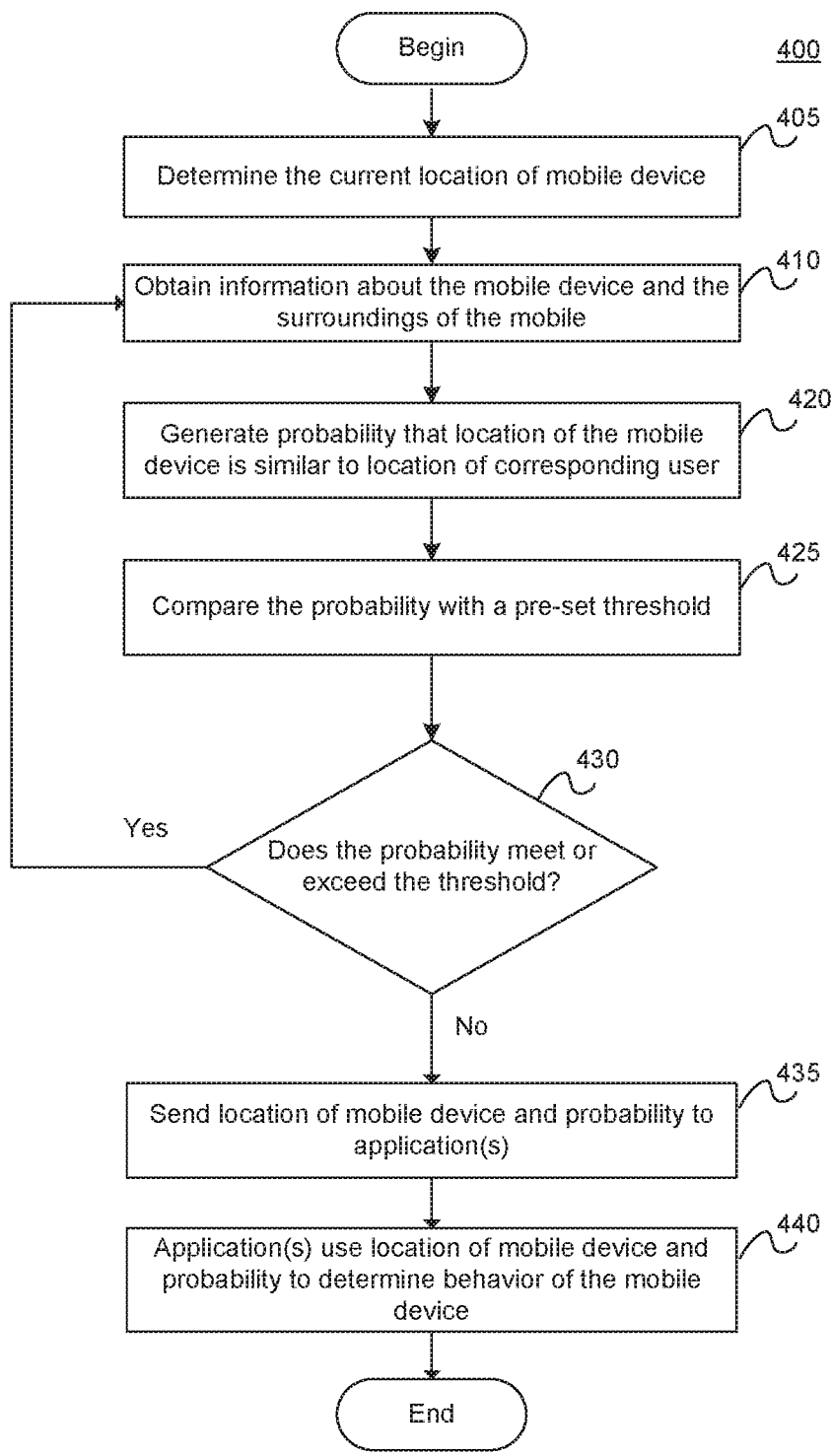
FIG. 4 illustrates a method for monitoring information from a mobile device to generate a probability that the mobile device is proximate to a corresponding user, according to one embodiment.

FIG. 4 illustrates a method 400 for monitoring information from a mobile device to generate a probability that the mobile device is proximate to a corresponding user, according to one embodiment. As shown, method 400 begins at step 405 where a colocation detection component obtains the location of a mobile device from a GPS on the mobile device. At step 410, the sensor data analysis component samples the sensors of the mobile device to obtain information about the mobile device and the surroundings of the mobile device.

At step 420, the sensor data analysis component analyzes the obtained information and generates the probability that the location of the mobile device is similar to the location of the corresponding user. At step 425, the sensor data analysis component compares the probability to a threshold. At step 430, the sensor data analysis component determines if the probability meets or exceeds the threshold. If so, the sensor data analysis component may wait for a pre-determined period of time before obtaining additional (or new) information about the device and surroundings of the device at step 410. The loop beginning at step 410 continues until the probability does not meet the threshold. Once the probability does not meet or exceed the threshold at step 430, the location of the mobile device and the probability are sent to an application on the mobile device (step 435). At step 440, one or more applications on the mobile device use the location and probability to determine or modify the behavior of the mobile device.

For example, an application on a mobile device may turn off or mute the speaker on the mobile device as long as the device is located in a conference room and the probability that a user is near the location of the device meets the threshold. The conference room may be defined by a geofence. When the mobile device is removed from the conference room, or the probability does not meet the threshold, the application may modify the behavior of the device by turning on or adjusting the volume of the speaker.

Figure 5:
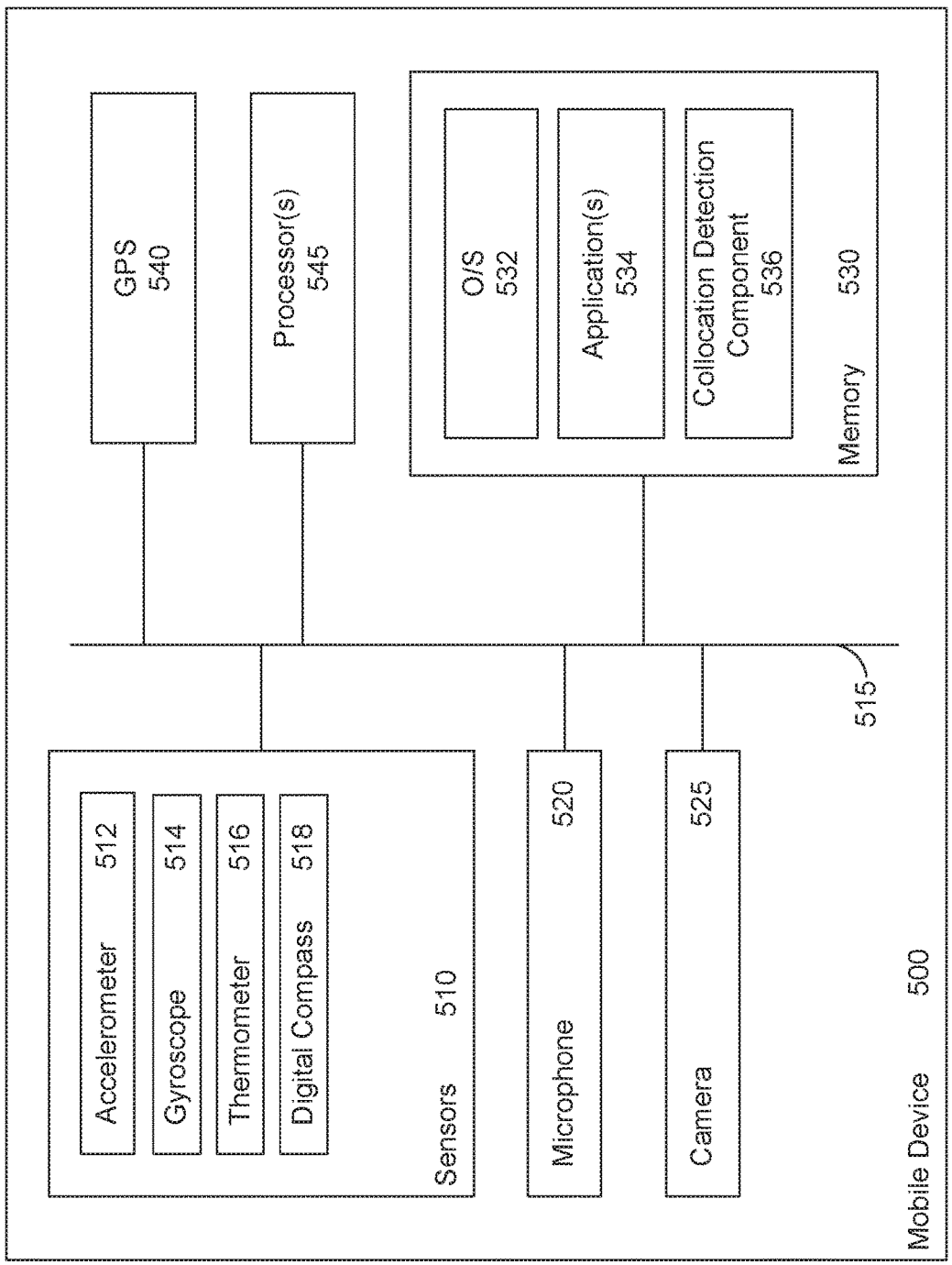
FIG. 5 illustrates an example mobile device configured with applications to determine a probability that a corresponding user is currently in possession of a mobile device, according to one embodiment.

FIG. 5 illustrates an example mobile device 500 configured with applications to determine a probability that a corresponding user is near the mobile device, according to one embodiment. Of course, embodiments of the invention may be adapted for use with a variety of computing devices, including PDAs, tablet computers, and other computing devices with a GPS and a component that can obtain data about the surroundings of the device (e.g., a sensor). As shown, mobile device 500 includes sensors 510, an interconnect 515, a microphone 520, a camera 525, a global positioning system (GPS) 540, one or more processors 545, and a memory 530. Of course, an actual mobile device may include a variety of additional hardware components.

The processor 545 retrieves and executes programming instructions stored in the memory 530 as well as stores and retrieves application data residing in the memory 530. The interconnect 515 is used to transmit instructions and data between the processor 545, sensors 510, microphone 520, camera 525, GPS 540 and memory 530. Processor 545 is included to be representative of a single processor, multiple processors, a single processor having multiple processing cores, and the like. Memory 530 is generally included to be representative of memory and storage on a mobile device, e.g., DDR and flash memory space.

The mobile O/S 532 provides software configured to control the execution of application programs on the mobile device. The colocation detection component 536 generally provides a software application configured to generate a probability of a location of a mobile device being similar to the location of a corresponding user. To do so, colocation detection component 536 accesses the sensors 510, camera 520, and microphone 525 to obtain information about the mobile device 500 and the surroundings of the mobile device.

Illustratively, sensors 510 include an accelerometer 512, a gyroscope 514, a thermometer 516, and a digital compass 518. The accelerometer may provide information related to the movement of mobile device 500. The gyroscope 514 and digital compass 518 may provide information related to the orientation of mobile device 500. The thermometer 516 provides the ambient temperature of mobile device 500. Sensors 510 may include additional components or fewer components.

Figure 6:
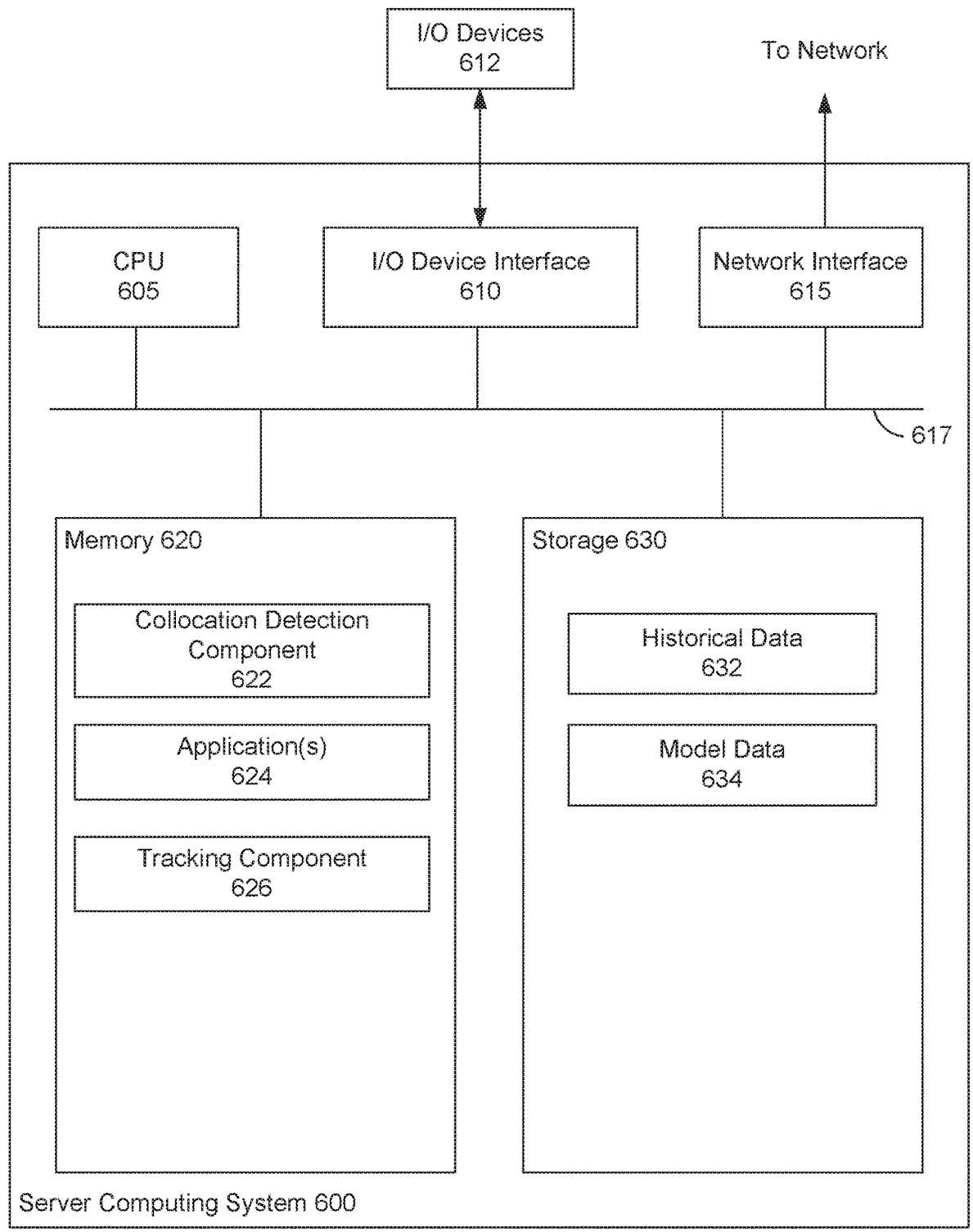
FIG. 6 illustrates an example computing system configured with a colocation detection component to generate a probability that a corresponding user is near a location of a mobile device, according to one embodiment.

FIG. 6 illustrates an example computing system 600 configured with a colocation detection component 622 to generate a probability that a corresponding user is near a location of a mobile device, according to one embodiment. As shown, the computing system 600 includes, without limitation, a central processing unit (CPU) 605, a network interface 615, a memory 620, and a storage 630, each connected to an interconnect 617. The computing system 600 may also include an I/O device interface 610 connecting I/O devices 612 (e.g., keyboard, display, mouse devices) to the computing system 600.

The CPU 605 retrieves and executes programming instructions stored in the memory 620 as well as stores and retrieves application data residing in the memory 620. The interconnect 617 is used to transmit instructions and data between the CPU 605, I/O device interface 610, storage 630, network interface 615 and memory 620. Note, CPU 605 is included to be representative of a single CPU, multiple CPUs, a single CPU having multiple processing cores, and the like. And the memory 620 is generally included to be representative of a random access memory. The storage 630 may be a disk drive storage device. Although shown as a single unit, the storage 630 may be a combination of fixed and/or removable storage devices, such as fixed disc drives, removable memory cards, optical storage, network attached storage (NAS), or a storage area-network.

Illustratively, the memory 620 includes the colocation detection component 622, one or more applications 624, and a tracking component 626. In certain aspects, these components may correspond to the components of the mobile device 200 described with reference to FIG. 1. As shown, the storage 630 includes historical data 632 and model data 634.

The colocation detection component 622 receives a request from a requesting party for the location of a mobile device as well as the probability that a corresponding user is located near the mobile device. Colocation detection component 622 obtains the location of the mobile device from a GPS on the mobile device. Colocation detection component 622 obtains information about the mobile device and the surroundings of the mobile device from sensors on the mobile device and/or from a camera and/or microphone on the mobile device. Colocation detection component 622 may also obtain information from other devices wirelessly connected to the mobile device (e.g., wearable devices). Based on the information obtained, the colocation detection component 622 generates the probability that the location of the mobile device is near the location of the corresponding user. Once generated, the colocation detection component 622 may expose the probability as well as the location of the mobile device to one or more applications 624.

In the preceding, reference is made to embodiments of the invention. However, the invention is not limited to specific described embodiments. Instead, any combination of the following features and elements, whether related to different embodiments or not, is contemplated to implement and practice the invention. Furthermore, although embodiments of the invention may achieve advantages over other possible solutions and/or over the prior art, whether or not a particular advantage is achieved by a given embodiment is not limiting of the invention. Thus, the following aspects, features, embodiments and advantages are merely illustrative and are not considered elements or limitations of the appended claims except where explicitly recited in a claim (s). Likewise, reference to "the invention" shall not be construed as a generalization of any inventive subject matter disclosed herein and shall not be considered to be an element or limitation of the appended claims except where explicitly recited in a claim(s).

Aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples a computer readable storage medium include: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the current context, a computer readable storage medium may be any tangible medium that can contain, or store a program for use by or in connection with an instruction execution system, apparatus or device.

The flowchart and block diagrams in the Figures illustrate the architecture, functionality and operation of possible implementations of systems, methods and computer program products according to various embodiments of the present invention. In this regard, each block in the flowchart or block diagrams may represent a module, segment or portion of code, which comprises one or more executable instructions for implementing the specified logical function(s). In some alternative implementations the functions noted in the block may occur out of the order noted in the figures. For example, two blocks shown in succession may, in fact, be executed substantially concurrently, or the blocks may sometimes be executed in the reverse order, depending upon the functionality involved. Each block of the block diagrams and/or flowchart illustrations, and combinations of blocks in the block diagrams and/or flowchart illustrations can be implemented by special-purpose hardware-based systems that perform the specified functions or acts, or combinations of special purpose hardware and computer instructions.

Embodiments of the invention may be provided to end users through a cloud computing infrastructure. Cloud computing generally refers to the provision of scalable computing resources as a service over a network. More formally, cloud computing may be defined as a computing capability that provides an abstraction between the computing resource and its underlying technical architecture (e.g., servers, storage, networks), enabling convenient, on-demand network access to a shared pool of configurable computing resources that can be rapidly provisioned and released with minimal management effort or service provider interaction. Thus, cloud computing allows a user to access virtual computing resources (e.g., storage, data, applications, and even complete virtualized computing systems) in "the cloud," without regard for the underlying physical systems (or locations of those systems) used to provide the computing resources.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the invention and its practical applications, to thereby enable others skilled in the art to best utilize the invention and various embodiments with various modifications as may be suited to the particular use contemplated.

While the foregoing is directed to embodiments of the present invention, other and further embodiments of the invention may be devised without departing from the basic scope thereof, and the scope thereof is determined by the claims that follow.

What is claimed is:

1. A computer-implemented method for predicting whether a location of a mobile device indicates a location of a corresponding user, the method comprising:
   determining the location of the mobile device;
   obtaining, from each of one or more sensors on the mobile device, sensor data indicating at least one of a current state of the mobile device and a current state of ambient surroundings of the mobile device;
   determining, based on the obtained sensor data, a probability that the corresponding user is currently in possession of the mobile device;
   determining that the probability that the corresponding user is currently in possession of the mobile device is less than a predefined threshold;
   based on the determination that the probability is less than the predefined threshold, taking one or more actions to modify one or more operational parameters of one or more output devices of the mobile device;
   sending, to a requesting party at a different device, the location of the mobile device; and
   sending, to the requesting party at the different device, the probability that the corresponding user is currently in possession of the mobile device along with the location.

2. The method of claim 1, further comprising
   receiving, by an application executing on the mobile device, a request for the location of the mobile device and the probability.

3. The method of claim 1, wherein the requesting party comprises a parent of the user.

4. The method of claim 1, wherein determining the probability that the corresponding user is currently in possession of the mobile device is performed rather than determining a probability that the corresponding user is currently using the mobile device.

5. The method of claim 1, wherein the obtained sensor data includes at least one of:
   motion detected on the mobile device;
   an amount of time passed since the last activity on the mobile device;
   an ambient temperature;
   a locked screen on the mobile device;
   the current state of the mobile device; and
   the current state of ambient surroundings of the mobile device.

6. The method of claim 1, wherein the one or more actions comprise one of unmuting a speaker of the mobile device or adjusting a volume of the speaker.

7. The method of claim 1, wherein the location is an absolute location of the mobile device determined by a global positioning system (GPS) of the mobile device.

8. The method of claim 7, wherein the one or more operational parameters of the one or more output devices are modified based on the absolute location, the probability, and a geo-fence, wherein the absolute location of the mobile device is within the geo-fence.

9. A non-transitory computer-readable storage medium storing instructions, which, when executed on a processor, perform an operation to predict whether a location of a mobile device indicates a location of a corresponding user, the operation comprising:
   determining the location of the mobile device;
   obtaining, from each of one or more sensors on the mobile device, sensor data indicating at least one of a current state of the mobile device and a current state of ambient surroundings of the mobile device;
   determining, based on the obtained sensor data, a probability that the corresponding user is currently in possession of the mobile device;
   determining that the probability that the corresponding user is currently in possession of the mobile device is less than a predefined threshold;
   based on the determination that the probability is less than the predefined threshold, taking one or more actions to modify one or more operational parameters of one or more output devices of the mobile device;
   sending, to a requesting party at a different device, the location of the mobile device; and
   sending, to the requesting party at the different device, the probability that the corresponding user is currently in possession of the mobile device along with the location.

10. The non-transitory computer-readable storage medium of claim 9, wherein the operation further comprises
    receiving, by an application executing on the mobile device, a request for the location of the mobile device and the probability.

11. The non-transitory computer-readable storage medium of claim 9, wherein the requesting party comprises a parent of the user.

12. The non-transitory computer-readable storage medium of claim 9, wherein the sensors include one or more of an accelerometer, a gyroscope, a thermometer, a compass, a camera, and a microphone.

13. The non-transitory computer-readable storage medium of claim 9, wherein the obtained sensor data includes at least one of:
    motion detected on the mobile device;
    an amount of time passed since the last activity on the mobile device;
    an ambient temperature;
    a locked screen on the mobile device;
    the current state of the mobile device; and
    the current state of ambient surroundings of the mobile device.

14. The non-transitory computer-readable storage medium of claim 9, wherein the one or more actions comprise one of unmuting a speaker of the mobile device or adjusting a volume of the speaker.

15. A system, comprising:

a processor; and a memory having instructions stored thereon, which, when executed on the processor, perform an operation to predict whether a location of a mobile device indicates a location of a corresponding user, the operation comprising:

determining the location of the mobile device;

obtaining, from each of one or more sensors on the mobile device, sensor data indicating at least one of a current state of the mobile device and a current state of ambient surroundings of the mobile device;

determining, based on the obtained sensor data, a probability that the corresponding user is currently in possession of the mobile device;

determining that the probability that the corresponding user is currently in possession of the mobile device is less than a predefined threshold;

based on the determination that the probability is less than the predefined threshold, taking one or more actions to modify one or more operational parameters of one or more output devices of the mobile device;

sending, to a requesting party at a different device, the location of the mobile device; and sending, to the requesting party at the different device, the probability that the corresponding user is currently in possession of the mobile device along with the location.

16. The system of claim 15, wherein the operation further comprises receiving, by an application executing on the mobile device, a request for the location of the mobile device and the probability.

17. The system of claim 15, wherein the requesting party comprises a parent of the user.

18. The system of claim 15, wherein the sensors include one or more of an accelerometer, a gyroscope, a thermometer, a compass, a camera, and a microphone.

19. The system of claim 15, wherein the obtained sensor data includes at least one of:

motion detected on the mobile device;

an amount of time passed since the last activity on the mobile device;

an ambient temperature;

a locked screen on the mobile device;

the current state of the mobile device; and the current state of ambient surroundings of the mobile device.

20. The system of claim 15, wherein the one or more actions comprise one of unmuting a speaker of the mobile device or adjusting a volume of the speaker.

* * * * *